(12) United States Patent
Li et al.

(10) Patent No.: US 11,895,242 B2
(45) Date of Patent: Feb. 6, 2024

(54) DATA PROCESSING METHOD AND APPARATUS IN BLOCKCHAIN NETWORK, STORAGE MEDIUM, AND COMPUTER DEVICE

(71) Applicant: Tencent Technology (Shenzhen) Company Limited, Shenzhen (CN)

(72) Inventors: Mao Cai Li, Shenzhen (CN); Geng Liang Zhu, Shenzhen (CN); Zong You Wang, Shenzhen (CN); Li Kong, Shenzhen (CN); Hu Lan, Shenzhen (CN); Kai Ban Zhou, Shenzhen (CN); Chang Qing Yang, Shenzhen (CN); Yi Fang Shi, Shenzhen (CN); Qui Ping Chen, Shenzhen (CN); Qu Cheng Liu, Shenzhen (CN); Jin Song Zhang, Shenzhen (CN); Pan Liu, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 422 days.

(21) Appl. No.: 17/197,485

(22) Filed: Mar. 10, 2021

(65) Prior Publication Data
US 2021/0203509 A1    Jul. 1, 2021

Related U.S. Application Data

(63) Continuation of application No. PCT/CN2020/113355, filed on Sep. 4, 2020.

(30) Foreign Application Priority Data

Sep. 12, 2019  (CN) .......................... 201910866452.0

(51) Int. Cl.
H04L 9/32        (2006.01)
H04L 9/30        (2006.01)
H04L 9/00        (2022.01)

(52) U.S. Cl.
CPC .............. *H04L 9/3239* (2013.01); *H04L 9/30* (2013.01); *H04L 9/3247* (2013.01); *H04L 9/3268* (2013.01); *H04L 9/50* (2022.05)

(58) Field of Classification Search
CPC ....... H04L 9/3239; H04L 9/30; H04L 9/3247; H04L 9/3268; H04L 9/50; H04L 9/3263;
(Continued)

(56) References Cited

U.S. PATENT DOCUMENTS

2016/0226718 A1* 8/2016 Hamburger ........... G06F 15/167
2017/0364908 A1* 12/2017 Smith .................. G06Q 20/023
(Continued)

FOREIGN PATENT DOCUMENTS

CN    108111604 A    6/2018
CN    108600315 A    9/2018
(Continued)

OTHER PUBLICATIONS

Office Action for Japan Patent Office Action No. 2021-555432 dated Nov. 1, 2022 (with English translation) (7 pages).
(Continued)

*Primary Examiner* — Don G Zhao
*Assistant Examiner* — Andrew Suh
(74) *Attorney, Agent, or Firm* — Crowell & Moring LLP

(57) ABSTRACT

A blockchain network includes a service sub-network, a consensus sub-network, and a routing layer configured to isolate the service sub-network from the consensus sub-network. A data processing method in the blockchain network includes: receiving a data processing request transmitted by a service node in the service sub-network; performing
(Continued)

identity verification on the service node according to the data processing request; obtaining a running load of each consensus node in the consensus sub-network when the verification succeeds; determining, from the consensus sub-network according to the running load, a target consensus node configured to process the data processing request; and forwarding the data processing request to the target consensus node, and performing corresponding data processing on the data processing request by using the target consensus node.

20 Claims, 7 Drawing Sheets

(58) Field of Classification Search
CPC ......... H04L 63/08; H04L 67/63; G06F 21/64; G06Q 30/04; G06Q 40/04
See application file for complete search history.

(56) References Cited

U.S. PATENT DOCUMENTS

| | | | | |
|---|---|---|---|---|
| 2018/0139278 A1* | 5/2018 | Bathen | ................... | H04L 9/3247 |
| 2019/0207767 A1* | 7/2019 | Ahn | ...................... | G06Q 20/065 |
| 2019/0370806 A1* | 12/2019 | Wang | ................... | G06Q 20/405 |
| 2021/0312088 A1* | 10/2021 | Choi | ..................... | H04L 63/123 |

FOREIGN PATENT DOCUMENTS

| | | |
|---|---|---|
| CN | 109308410 A | 2/2019 |
| CN | 109447648 A | 3/2019 |
| CN | 109447811 A | 3/2019 |
| CN | 109451036 A | 3/2019 |
| CN | 109547530 A | 3/2019 |
| CN | 109635585 A | 4/2019 |
| CN | 109767220 A | 5/2019 |
| CN | 109949158 A | 6/2019 |
| CN | 110602096 A | 12/2019 |
| CN | 111566649 A | 8/2020 |
| KR | 10-2019-0069759 A | 6/2019 |

OTHER PUBLICATIONS

Extended European Search Report received for Application No. EP 20862111.0 dated Mar. 18, 2022 (Chinese language only) (7 pages).

International Search Report and Written Opinion received for Application No. PCT/CN2020/113355 dated Nov. 26, 2020 (9 pages).

Search Report from the China State Intellectual Property Office for Application No. CN 2019108664520 dated Mar. 10, 2021 (only Chinese language), (9 pages).

* cited by examiner

DATA PROCESSING METHOD AND APPARATUS IN BLOCKCHAIN NETWORK, STORAGE MEDIUM, AND COMPUTER DEVICE

RELATED APPLICATION

This application claims priority to PCT App. No. PCT/CN2020/113355, filed on Sep. 4, 2020, which claims priority to Chinese Patent Application No. 201910866452.0, entitled "DATA PROCESSING METHOD AND APPARATUS IN BLOCKCHAIN NETWORK, STORAGE MEDIUM, AND DEVICE" and filed with the National Intellectual Property Administration, PRC on Sep. 12, 2019, both of which is incorporated herein by reference in its entirety.

FIELD OF THE TECHNOLOGY

This application relates to the field of computer technologies, and in particular, to a data processing method and apparatus in a blockchain network, a computer-readable storage medium, and a computer device.

BACKGROUND OF THE DISCLOSURE

Different from public participation of a public blockchain, information in a blockchain network often has a feature of "open within the alliance, confidential to the outside". However, a conventional blockchain network is usually not protected by the proof of work, and is more prone to be attacked by an external node that can access the blockchain network. Especially when the blockchain network is applied to some scenarios of processing confidential data, it is more important to protect security and processing performance of the blockchain network, to avoid a possible danger existing if the blockchain network is under a network attack at a network level.

SUMMARY

A data processing method in a blockchain network is provided, the blockchain network including a service sub-network, a consensus sub-network, and a routing layer configured to isolate the service sub-network from the consensus sub-network, and the method being performed by a computer device and including:

receiving a data processing request transmitted by a service node in the service sub-network;

performing identity verification on the service node according to the data processing request;

obtaining a running load of each consensus node in the consensus sub-network in a case that the verification succeeds;

determining, from the consensus sub-network according to the running load, a target consensus node configured to process the data processing request; and forwarding the data processing request to the target consensus node; and performing corresponding data processing on the data processing request by using the target consensus node.

One or more non-transitory computer-readable storage media storing computer-readable instructions is provided. The computer-readable instructions, when executed by one or more processors, causing the one or more processors to perform operations comprising:

receiving a data processing request transmitted by a service node in a service sub-network, wherein a blockchain network comprises the service sub-network, a consensus sub-network, and a routing layer configured to isolate the service sub-network from the consensus sub-network;

performing identity verification on the service node according to the data processing request;

obtaining a running load of each consensus node in the consensus sub-network when the verification succeeds;

determining, from the consensus sub-network according to the running load, a target consensus node configured to process the data processing request;

forwarding the data processing request to the target consensus node; and performing corresponding data processing on the data processing request by using the target consensus node.

A data processing apparatus in a blockchain network is provided, the blockchain network including a service sub-network, a consensus sub-network, and a routing layer configured to isolate the service sub-network from the consensus sub-network, and the apparatus including:

a receiving module, configured to receive a data processing request transmitted by a service node in the service sub-network;

a verification module, configured to perform identity verification on the service node according to the data processing request;

an obtaining module, configured to obtain a running load of each consensus node in the consensus sub-network when the verification succeeds;

a determining module, configured to determine, from the consensus sub-network according to the running load, a target consensus node configured to process the data processing request; and a forwarding module, configured to:
forward the data processing request to the target consensus node; and
perform corresponding data processing on the data processing request by using the target consensus node.

One or more non-transitory computer-readable storage media storing computer-readable instructions are provided, the computer-readable instructions, when executed by one or more processors, causing the one or more processors to perform the following operations:

receiving a data processing request transmitted by a service node in a service sub-network;

performing identity verification on the service node according to the data processing request;

obtaining a running load of each consensus node in a consensus sub-network when the verification succeeds;

determining, from the consensus sub-network according to the running load, a target consensus node configured to process the data processing request;

forwarding the data processing request to the target consensus node; and performing corresponding data processing on the data processing request by using the target consensus node.

A computer device is provided, including a memory and one or more processors, the memory storing computer-readable instructions, the computer-readable instructions, when being executed by the processors, causing the one or more processors to perform the following operations:

receiving a data processing request transmitted by a service node in a service sub-network;

performing identity verification on the service node according to the data processing request;

obtaining a running load of each consensus node in a consensus sub-network when the verification succeeds;

determining, from the consensus sub-network according to the running load, a target consensus node configured to process the data processing request;

forwarding the data processing request to the target consensus node; and performing corresponding data processing on the data processing request by using the target consensus node.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more understandable, this application is further described in detail below with reference to accompanying drawings and embodiments. It is to be understood that the specific embodiments described herein are only used for describing this application, but are not intended to limit this application.

Figure 1:
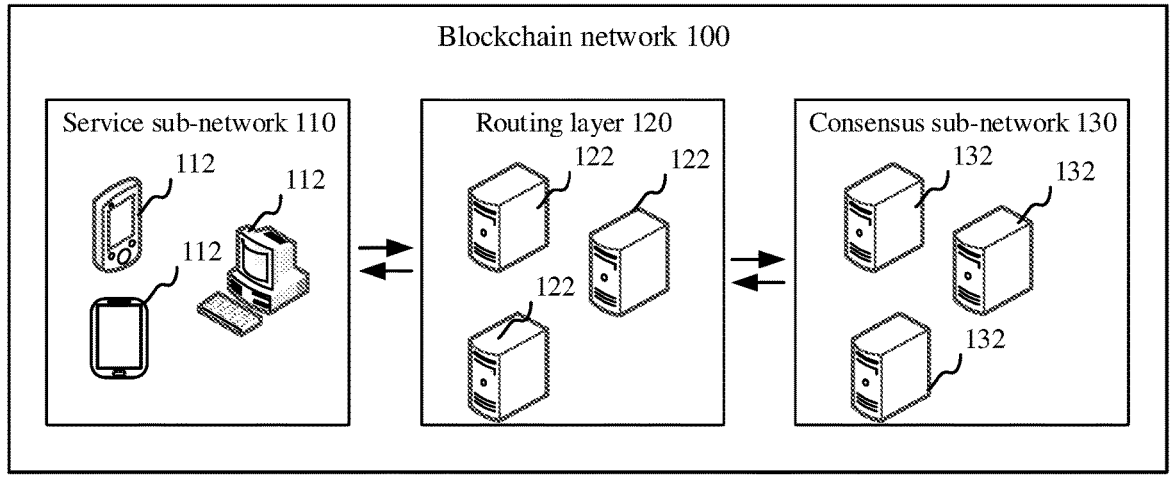
FIG. 1 is a diagram of an application environment of a data processing method in a blockchain network according to an embodiment.

FIG. 1 is a diagram of an application environment of a data processing method in a blockchain network according to an embodiment. Referring to FIG. 1, the data processing method in a blockchain network is applied to a blockchain network 100. The blockchain network includes a network formed by related nodes recording and querying a data block on a blockchain. Each node in the blockchain network is a blockchain node, and is a computer device that can query or record the data block. As shown in FIG. 1, the blockchain network 100 includes a service sub-network 110, a routing layer 120, and a consensus sub-network 130. A service node 112 in the service sub-network 110 is connected to a routing node 122 in the routing layer 120 through a network. The routing node 122 is connected to a consensus node 132 in the consensus sub-network 130 through a network. Therefore, the service sub-network 110 needs to communicate with the consensus sub-network 130 by using the routing node 122.

The service node 112 may be specifically a desktop terminal or a mobile terminal used by a service party that generates transaction information. The mobile terminal may be specifically at least one of a mobile phone, a tablet computer, a notebook computer, and the like. The routing node 122 may be implemented by using an independent server or a server cluster that includes a plurality of servers. The consensus node 132 in the consensus sub-network 130 may record transaction information generated by the service node to a blockchain, and the consensus node 132 may be implemented by using an independent server or a server cluster that includes a plurality of servers. When the blockchain network is applied to an application scenario of processing electronic bill data, the consensus node in the consensus sub-network is usually authorized and set by a supervision organization.

Figure 2:
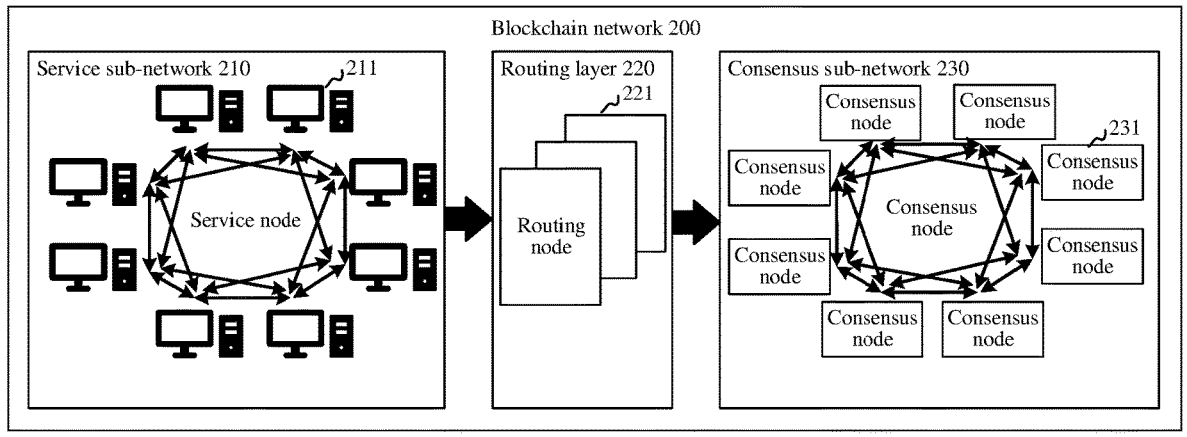
FIG. 2 is a schematic architectural diagram of a blockchain network according to an embodiment.

FIG. 2 is a schematic architectural diagram of a blockchain network according to an embodiment. Referring to FIG. 2, a blockchain network 200 includes a service sub-network 210, a routing layer 220, and a consensus sub-network 230. The service sub-network 210 includes a service node 211 that performs verification on a data block recorded on a blockchain by a consensus node, and the consensus sub-network 230 includes a consensus node 231 that records a data block on a blockchain. The service sub-network 210 is connected to the consensus sub-network 230 by using the routing layer 220. A routing node 221 in the routing layer 220 may transfer a data processing request transmitted by the service node 211 to the consensus node 231, and the routing node 221 may further forward transaction information on the blockchain obtained from the consensus node 231 to the service node 211. The service node 211 is deployed in a service sub-network in a public network, and the consensus node 231 running a blockchain consensus protocol is deployed in a private consensus sub-network 230. The service node 211 interacts with the consensus node 231 by using the routing node 221, and the routing layer 220 isolates the service sub-network 210 from the core consensus sub-network 230. In the service sub-network 210, service nodes are equivalent. The service node 211 may transfer a message received from the routing node 221 to a surrounding service node, so that the message can be propagated among the service nodes in the service sub-network.

Figure 3:
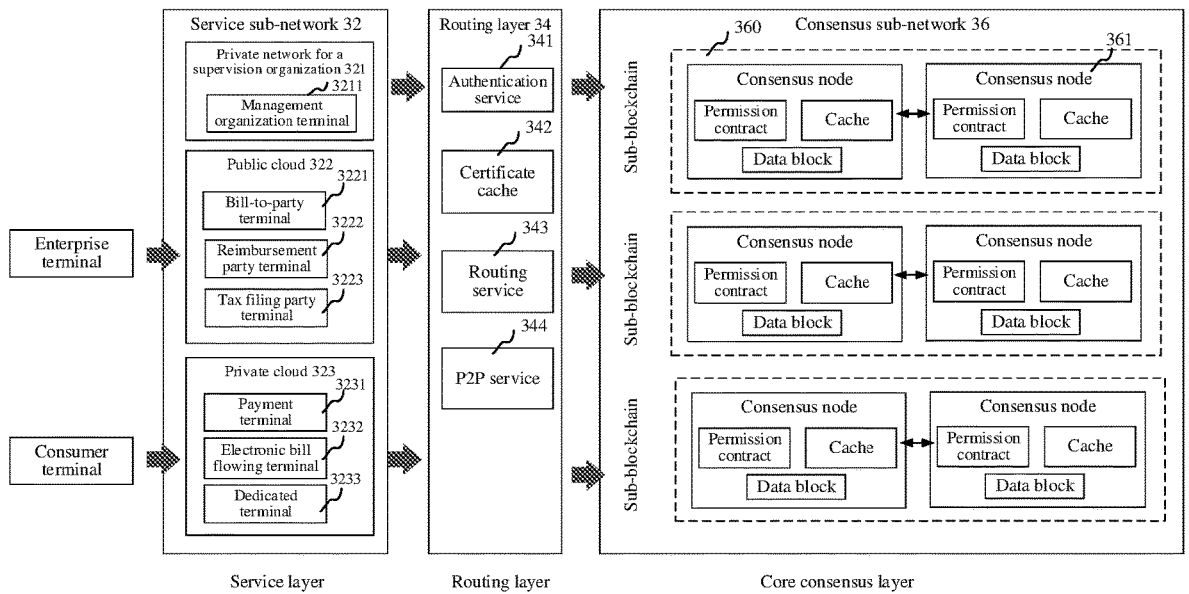
FIG. 3 is a schematic architectural diagram of a blockchain network applied to a scenario of an electronic bill according to a specific embodiment.

FIG. 3 is a schematic architectural diagram of a blockchain network applied to a scenario of an electronic bill according to a specific embodiment. When the blockchain network is applied to a scenario of an electronic bill, the blockchain network may record transaction information generated in an entire electronic bill flowing process. Referring to FIG. 3, the blockchain network includes a service sub-network 32, a routing layer 34, and a consensus sub-network 36.

The electronic bill flowing process includes processes such as claiming of electronic bills, issuance of an electronic bill, reimbursement of an electronic bill, and tax-filing of an electronic bill, and the issuance of the electronic bill is also referred to as generation of the electronic bill. Roles related to the entire electronic bill flowing process include a supervision organization, a bill-to-party, a reimbursement party, and a tax filing party. Therefore, the service sub-network 32 includes a private network for a supervision organization 321 providing a related service to the supervision organization, a public cloud 322 providing a related service to the bill-to-party, the reimbursement party, and the tax filing party, and a private cloud 323 providing an electronic bill storage service to a consumer. The private network for a supervision organization 321 includes a computer device used by the supervision organization related to the electronic bill, including a management organization terminal 3211. The public cloud 322 includes computer devices used by the bill-to-party, the reimbursement party, and the tax filing party related to the electronic bill, including a bill-to-party terminal 3221, a reimbursement party terminal 3222, and a tax filing party terminal 3223. The bill-to-party may be a billing service provider, the reimbursement party may be a reimbursement service provider, and an enterprise terminal may access the public cloud. The private cloud 323 includes computer devices used by users related to the electronic bill, including a payment terminal 3231 configured for payment, an electronic bill flowing terminal 3232 configured to temporarily store an electronic bill for a user, and a dedicated terminal 3233 for some enterprises. A consumer terminal may access the private cloud. The computer devices in the private network for a supervision organization 321, the public cloud 322, and the private cloud 323 may all be used as service nodes to transmit a data chaining request or a data query request for an electronic bill to the consensus sub-network by using the routing node.

Any routing node in the routing layer 34 include functional modules for providing an authentication service 341, a certificate cache 342, a routing service 343, and a peer to peer ("P2P") service 344. The authentication service 341 is used for performing identity verification on the service node in the service sub-network 32, the certificate cache 342 is used for caching certificates of identity of nodes, the routing service 343 is used for implementing network isolation between the service sub-network 32 and the consensus sub-network 36, and the P2P service 344 is used for distributing a task between routing nodes having idempotence.

The consensus sub-network 36 includes a plurality of sub-consensus sub-networks 360, each sub-consensus sub-network 360 includes a plurality of consensus nodes 361, and the plurality of consensus nodes 361 maintain a sub-blockchain corresponding to the sub-consensus sub-network 360. For example, some sub-blockchains are used for recording transaction information related to electronic bills belonging to a specific bill number segment interval, and some sub-blockchains are used for recording transaction information related to red electronic bills. When data related to the electronic bill needs to be recorded, a sub-blockchain to which the data is to be recorded may be determined according to attribute of the transaction information and then the data is recorded by a sub-consensus sub-network maintaining the sub-blockchain. The consensus nodes 361 may usually be computer devices used by supervision organizations of regions. The consensus nodes 361 in the each sub-consensus sub-network 360 include permission contracts, the permission contract stores flow logic for an entire lifecycle of an electronic bill, for example, a bill state of the electronic bill, a flowing process, access permission of data, a claiming condition of the electronic bill, and an issuance condition of the electronic bill. The consensus node 361 further includes a cache and a data block, and the functions may provide support for the chaining and querying of transaction information.

Figure 4:
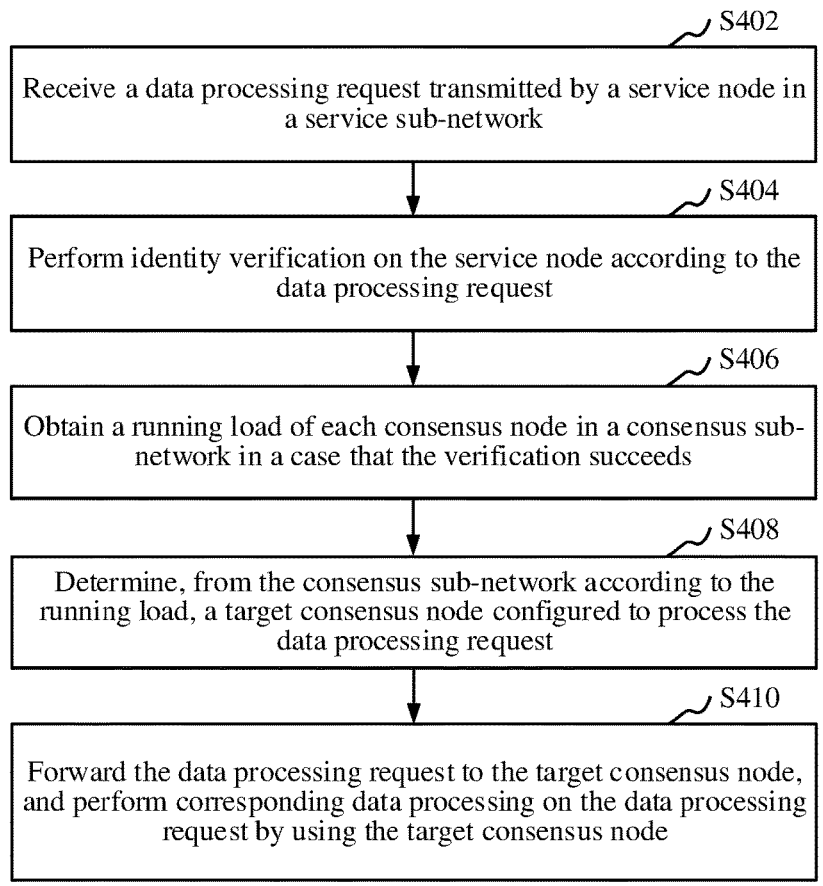
FIG. 4 is a schematic flowchart of a data processing method in a blockchain network according to an embodiment.

As shown in FIG. 4, in an embodiment, a data processing method in a blockchain network is provided. In one embodiment, the description for FIG. 4 refers to the example from FIG. 1 with the routing node 122 in the blockchain network 100. The blockchain network 100 includes a service sub-network 110, a routing node 122, and a consensus sub-network 130, the service sub-network 110 includes a service node 112 for generating transaction information, the consensus sub-network 130 includes a consensus node 132 for chaining the transaction information, and the service sub-network 110 is further used for verifying a data block recorded on a blockchain by the consensus node 132. In an embodiment, the method is provided by a routing service of the routing node in FIG. 3. Referring to FIG. 4, the data processing method in a blockchain network specifically includes the following steps.

S402. Receive a data processing request transmitted by a service node in a service sub-network.

In this embodiment, the service node in the service sub-network forwards the data processing request to a consensus node in a consensus sub-network by using the routing node, and the data processing request includes a data chaining request, a data query request, and the like. In an application scenario of an electronic bill, the data processing request includes a bill claiming request, a bill issuing request, a bill reimbursement request, a bill tax filing request, a bill information query request, and the like.

To ensure security of the blockchain network, the consensus node for chaining the transaction information and the service node for verifying the data block and querying the transaction information that are in the blockchain network need to sign a request or data in an interaction process, and a public key and a private key used for a signature are issued by the supervision organization during registration.

In an embodiment, the service node is an enterprise terminal for claiming a blank electronic bill, and the data processing request is a bill claiming request. The bill claiming request carries a bill-to-party identifier. When an electronic bill is claimed, the enterprise terminal may sign a claiming request by using a private key and send a signed claiming request to the routing node. The routing node may perform signature verification on the signed bill claiming request and forward the claiming request on which verification succeeds to the consensus sub-network.

In an embodiment, the service node is a billing terminal for issuing an electronic bill, and the data processing request is a bill issuing request. The billing terminal may obtain bill issuing information carrying a bill-to-party identifier, an electronic bill identifier, a bill amount, and a tax filing party identifier, and then send a bill issuing request obtained after signing the bill issuing information to the routing node. The routing node performs identity verification on a signed bill issuing request, and forwards the bill issuing request to the consensus sub-network after the verification succeeds. The consensus sub-network records information related to an issued electronic bill on a blockchain after responding to the bill issuing request.

In an embodiment, the service node is a reimbursement terminal for reimbursing an electronic bill, and the data processing request is a bill reimbursement request. The bill reimbursement terminal may obtain bill reimbursement information carrying a reimbursement party identifier, a bill identifier, and bill information, sign the bill reimbursement information by using a private key issued during registration to obtain a bill reimbursement request, and forward the bill reimbursement request to the routing node.

In an embodiment, the service node is a tax filing terminal for filing tax of an electronic bill. The data processing request is an electronic bill tax filing request. The tax filing terminal may query an electronic bill and a tax parameter that correspond to a tax filing party identifier, determine an electronic bill identifier for tax filing this time, and generate bill tax filing information according to the electronic bill identifier. The tax filing terminal signs the bill tax filing information by using a private key issued during registration to obtain a bill tax filing request, and forwards the bill tax filing request to the routing node.

After completing a response to the bill claiming request, the bill issuing request, the bill reimbursement request, and the bill tax filing request, the consensus sub-network records related transaction information for completing the claiming, the issuance, the reimbursement, and the tax-filing to a blockchain, and returns a corresponding block header to the service node initiating a request. The service node may verify abstract information in the block header, thereby monitoring the transaction information recorded on the blockchain network by the consensus sub-network. Further, the service node may initiate a data query request for transaction information in a block body corresponding to the block header, and the data query request may be signed by using a private key of the service node. The service node sends a signed data query request to the routing node, and the routing node obtains a public key corresponding to the private key of the service node, performs verification on the data query request, and determines that identity verification on the service node succeeds if the verification succeeds. The routing node may send the data query request to a corresponding consensus node in the consensus sub-network, so that the consensus node returns corresponding transaction information to the routing node according to data permissions of the service node initiating the data query request, and the routing node forwards the transaction information to the service node.

S404. Perform identity verification on the service node according to the data processing request.

As mentioned above, during registration, each service node needs to obtain a public/private key pair or a certificate of identity that can identify an authorized identity of each service node, and to sign data in a network interaction process, thereby ensuring validity and security of the data. When providing a public/private key pair for the service node or the consensus node, an official organization further sends a corresponding public key or a certificate of identity including the public key to the routing node, and the routing node stores the public key or the certificate of identity. Specifically, after signing the data processing request by using a private key in the public/private key pair, the service node transmits the data processing request to the routing node. After receiving the signed data processing request, the routing node obtains the public key or the public key in the certificate of identity of the service node, and performs signature verification on the data processing request by using the obtained public key, thereby implementing identity verification on the service node and implementing authentication on validity of the data processing request. That is, the identity verification on the service node does not need to be performed by using the consensus sub-network, but is performed by the routing node. In this way, even if there are a relatively large quantity of service nodes, security of the consensus sub-network may also be ensured.

In an embodiment, the data processing request is obtained by using a private key signature of the service node. The performing identity verification on the service node according to the data processing request includes: obtaining a public key corresponding to the private key of the service node; performing signature verification on a signed data processing request according to the public key; and determining that the identity verification on the service node succeeds when the verification succeeds.

Specifically, the routing node decrypts the signed data processing request by using the public key of the service node, to obtain a hash value corresponding to the data processing request, and calculates a hash value corresponding to the data processing request according to the same algorithm used during signature of the service node. If the hash value obtained through decryption is consistent with the hash value obtained through calculation, it indicates that the verification succeeds and it is determined that the identity verification on the service node succeeds. The routing node may forward the data processing request to the consensus node in the consensus sub-network, so that the consensus node performs corresponding data processing in response to the data processing request.

S406. Obtain a running load of each consensus node in a consensus sub-network when the verification succeeds.

In the foregoing described consensus sub-network, the consensus sub-network includes a plurality of consensus nodes, and the consensus nodes have idempotence. There is no difference that any data processing request is sent to any consensus node in the consensus sub-network. However, due to fluctuation and imbalance of network traffic, processing performance of the consensus sub-network for the data processing request may be insufficient. As a result, service performance of the entire blockchain network is reduced. Therefore, a request distribution policy is configured on the routing node, and the data processing request is evenly forwarded to different consensus nodes according to load capacities of the consensus nodes.

The running load indicates a processing task volume of each consensus node in the current consensus sub-network, and the running load may be represented by using a quantity of data processing requests currently to be processed by the consensus node. Specifically, each consensus node may actively report a current running load regularly, or the routing node may obtain a running load from the each consensus node.

S408. Determine, from the consensus sub-network according to the running load, a target consensus node configured to process the data processing request.

Specifically, the routing node may determine a target consensus node with a relatively small running load from the consensus nodes according to running loads of the consensus nodes, and forward the data processing request to the determined target consensus node, and the target consensus node performs corresponding data processing. In this way, even if the service node initiates a relatively large quantity of data processing requests, the data processing requests can also be evenly distributed to the consensus nodes in the consensus sub-network, thereby ensuring service performance of the blockchain network.

S410. Forward the data processing request to the target consensus node, and perform corresponding data processing on the data processing request by using the target consensus node.

The consensus sub-network includes full data, including confidential data and sensitive data. Therefore, all external service nodes need to access the consensus sub-network by using the routing node, to facilitate isolating the external node from the consensus sub-network in a network level, to avoid a malicious attack from the external node.

After the identity verification on the service node succeeds, the routing node forwards the data processing request to the consensus sub-network, and the consensus sub-network may perform corresponding data processing on the data processing request. The routing node may send, according to a type of the data processing request, the data processing request to a sub-consensus sub-network corresponding to the type. The routing node may further obtain running loads of the consensus nodes in the consensus sub-network in real time, and evenly distribute the data processing requests to the consensus nodes in the consensus sub-network.

In an embodiment, the data processing request is a data chaining request, and the performing corresponding data processing on the data processing request by using the target consensus node includes: generating a hash value corresponding to transaction information in the data chaining request by using the consensus node in the consensus sub-network, and signing the hash value according to a private key of the consensus node; recording the generated hash value and the signed hash value to a block header by using the consensus node, and recording the transaction information to a block body, the block header and the block body forming a data block; and performing a consensus process on the data block by using the consensus sub-network, and recording the data block to a blockchain in the consensus sub-network after a consensus is reached.

Specifically, the data block is formed by the block header and the block body. When the data processing request is a data chaining request, the consensus node may first generate a corresponding hash value according to transaction information in the data chaining request, and then the consensus node signs the hash value according to an issued private key, and records the generated hash value and the signed hash value to the block header. To ensure tamper-proofing of data recorded in each data block on the blockchain, a hash value of a previous data block may be further stored in a current block header. The consensus node records the transaction information in the block body of the data block. Finally, the consensus node performs a consensus process between the obtained data block and the consensus sub-network (or a sub-consensus sub-network in some embodiments) related to the current transaction information, and records the data block to the blockchain in the consensus sub-network after a consensus is reached.

In an embodiment, the method further includes: receiving a block header returned by the consensus node, and forwarding the block header to the service node; obtaining a public key corresponding to the private key of the consensus node by using the service node, performing signature verification on the signed hash value according to the public key of the consensus node, and determining, when the verification succeeds and a hash value obtained through the signature verification is consistent with the hash value of the transaction information recorded in the block header, that verification on the data block succeeds.

Specifically, after chaining the transaction information in the data chaining request, the consensus sub-network further returns the block header of the data block to the service node by using the routing node. After the verification on the block header succeeds, the service node may store the block header, to prevent the consensus sub-network from collective fraud or tampering with data, thereby monitoring the consensus sub-network. When the consensus node is registered, the official organization also issues a public/private key pair for the consensus node, and sends a public key in the public/private key pair or a certificate of identity including the public key to the service node. Therefore, the service node may obtain the public key of the consensus node, verify a signature in a returned block header by using the public key of the consensus node, and obtain a decrypted hash value of the transaction information after the verification succeeds. If the hash value obtained through decryption is consistent with the hash value of the transaction information recorded in the block header, it indicates that the verification on the data block corresponding to the block header succeeds.

In an embodiment, the data processing request is a transaction information query request. The performing corresponding data processing on the data processing request by using the target consensus node includes: obtaining data permission of the service node by using the consensus node in the consensus sub-network; and determining, according to the data permission by using the consensus node, whether the service node is a service node associated with transaction information in a data block. The method further includes: receiving, when the consensus node determines that the service node is the service node associated with the transaction information in the data block, transaction information returned by the consensus node, and forwarding the transaction information to the service node.

Specifically, after the service node receives a block header forwarded by the routing node, the service node may further obtain a corresponding block body from the consensus sub-network, to query transaction information recorded in the block body. The consensus node stores a permission contract. When receiving a transaction information query request forwarded by the routing node, the consensus node may determine data permission of the service node according to the permission contract, and determine, according to the data permission, whether the service node initiating the transaction information query request is a service node associated with the transaction information recorded in the block body. If the service node initiating the transaction information query request is the service node associated with the transaction information recorded in the block body, the consensus node sends, by using the routing node, the transaction information recorded in the block body to the service node.

According to the data processing method in a blockchain network, a service sub-network is isolated from a consensus sub-network by using a routing node, and only the routing node has a capability of directly accessing the consensus sub-network. In this way, when any external service node needs to access a consensus node, an identity of the service node for transmitting a data processing request needs to be verified by using the routing node, to check security of each data processing request. The routing node obtains a running load of each consensus node in the consensus sub-network only when the identity verification succeeds, and only after a target consensus node configured to process the data processing request is determined from the consensus sub-network according to the running load, the routing node forwards the data processing request sent by the external service node to the consensus sub-network. Then, the consensus sub-network performs corresponding data processing on the data processing request, so that a possible danger existing in a case in which the consensus sub-network is under a network attack from an external node in a network level is avoided, thereby ensuring network security inside the consensus sub-network. In addition, data processing requests may be evenly forwarded, thereby improving processing performance of the consensus sub-network.

Figure 5:
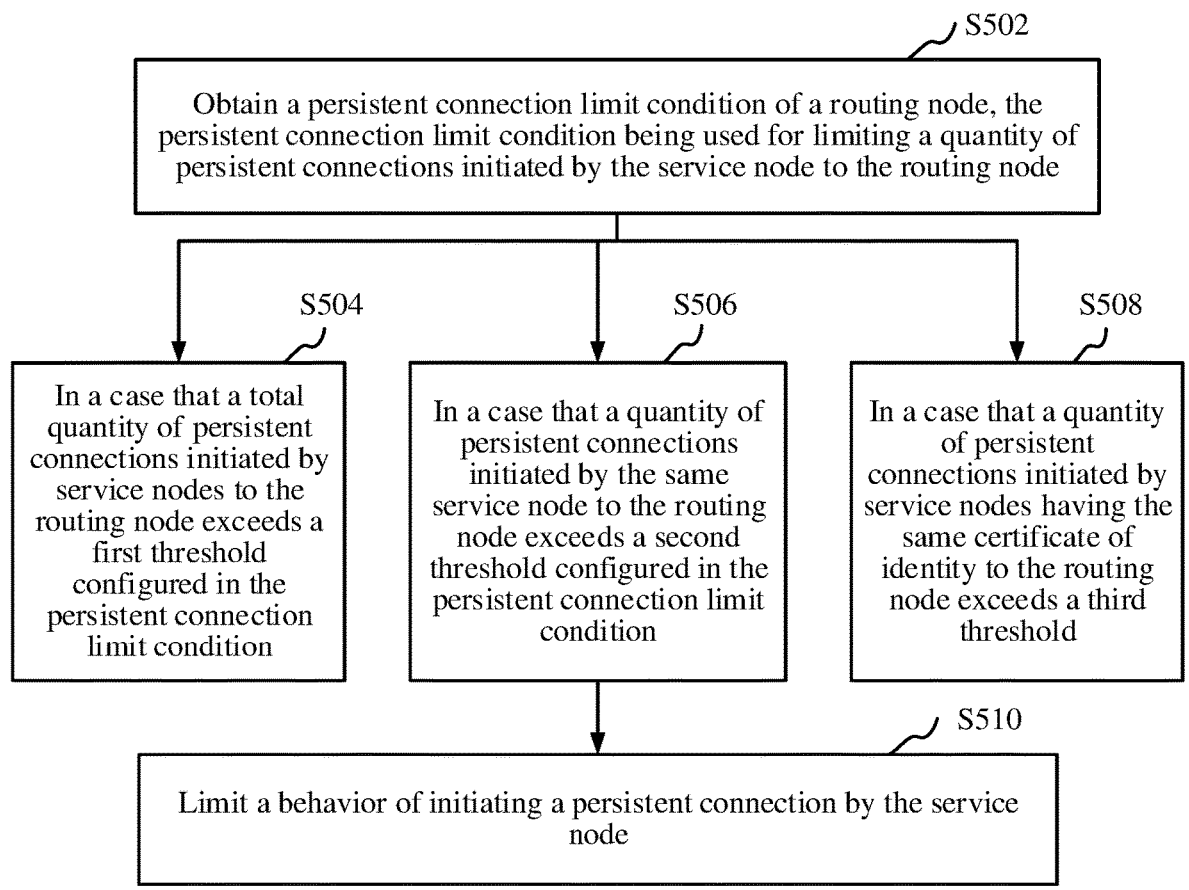
FIG. 5 is a schematic flowchart of limiting a behavior of initiating a persistent connection by a service node according to an embodiment.

In an embodiment, as shown in FIG. 5, the method further includes a step of limiting a behavior of initiating a persistent connection by the service node, specifically including:

S502. Obtain a persistent connection limit condition of the routing node, the persistent connection limit condition being used for limiting a quantity of persistent connections initiated by the service node to the routing node.

S504. In a case that a total quantity of persistent connections initiated by service nodes to the routing node exceeds a first threshold configured in the persistent connection limit condition, or S506. In a case that a quantity of persistent connections initiated by the same service node to the routing node exceeds a second threshold configured in the persistent connection limit condition, or S508. In a case that a quantity of persistent connections initiated by service nodes having the same certificate of identity to the routing node exceeds a third threshold, perform step S510.

S510. Limit a behavior of initiating a persistent connection by the service node. The use of the term limit may also include a stop, a prevention, or a disabling. Accordingly, in some embodiments, the limiting of behavior may alternatively include stopping, preventing, or disabling the behavior.

In this embodiment, the routing node further limits traffic of the service node for accessing the consensus sub-network, to ensure a traffic balance and security of the blockchain network, thereby preventing the consensus sub-network from a malicious attack of the external service node. The routing node belongs to a routing layer, the routing layer includes a plurality of routing nodes having idempotence, and the external service node may transmit a data processing request to any one of the routing nodes with no difference generated. The persistent connection limit condition is stored in the routing node, to limit a quantity of times that the routing node receives a persistent connection, thereby ensuring an upper limit of concurrency from the external node to the consensus sub-network.

The persistent connection limit condition is a preset persistent connection configuration parameter, including the first threshold corresponding to the total quantity of the persistent connections sent by a plurality of current service nodes to the routing node, the second threshold corresponding to the quantity of the persistent connections initiated by the same service node to the routing node, and the third threshold corresponding to the quantity of the persistent connections initiated by the service nodes having the same certificate of identity to the routing node. The first threshold limits a quantity of times that the entire routing layer receives the persistent connection, and ensures that an upper limit of concurrency of data forwarded from the routing layer to the consensus sub-network is not excessively large, thereby avoiding resource exhaustion or network breakdown of the consensus sub-network that is caused by excessive concurrency and that affects running of the entire blockchain network. The second threshold ensures that an upper limit of concurrency of persistent connections that can be initiated by a single service node to the routing layer is not excessively large, and may avoid a case that a single service node is faulty or performs a malicious act to run out of a service resource of the routing layer by establishing a large quantity of persistent connections, resulting in that other service nodes cannot perform accessing. The third threshold ensures an upper limit of a persistent connection behavior of a specific identity, and may prevent a malicious institution or unit from setting a large quantity of service nodes by using a certificate of identity of the malicious institution or unit to provide concurrency and occupy excessive service resources of the routing layer. Moreover, the third threshold may further facilitate the routing node to record an institution or unit corresponding to an identity with an excessively large quantity of connections, thereby accordingly performing penalty on the institution or unit.

Therefore, when the routing node determines, through counting, that a total quantity of persistent connections initiated by all service nodes exceeds the first threshold, or a quantity of persistent connections initiated by the same service node exceeds the second threshold, or a quantity of persistent connections initiated by service nodes having the same certificate of identity exceeds the third threshold, the behavior of initiating a persistent connection by the service node is limited. The limiting the behavior of initiating a persistent connection by the service node is to reject a response to a corresponding data processing request, or add a data processing request to a cache queue, and preferentially process an uncompleted data processing request.

Figure 6:
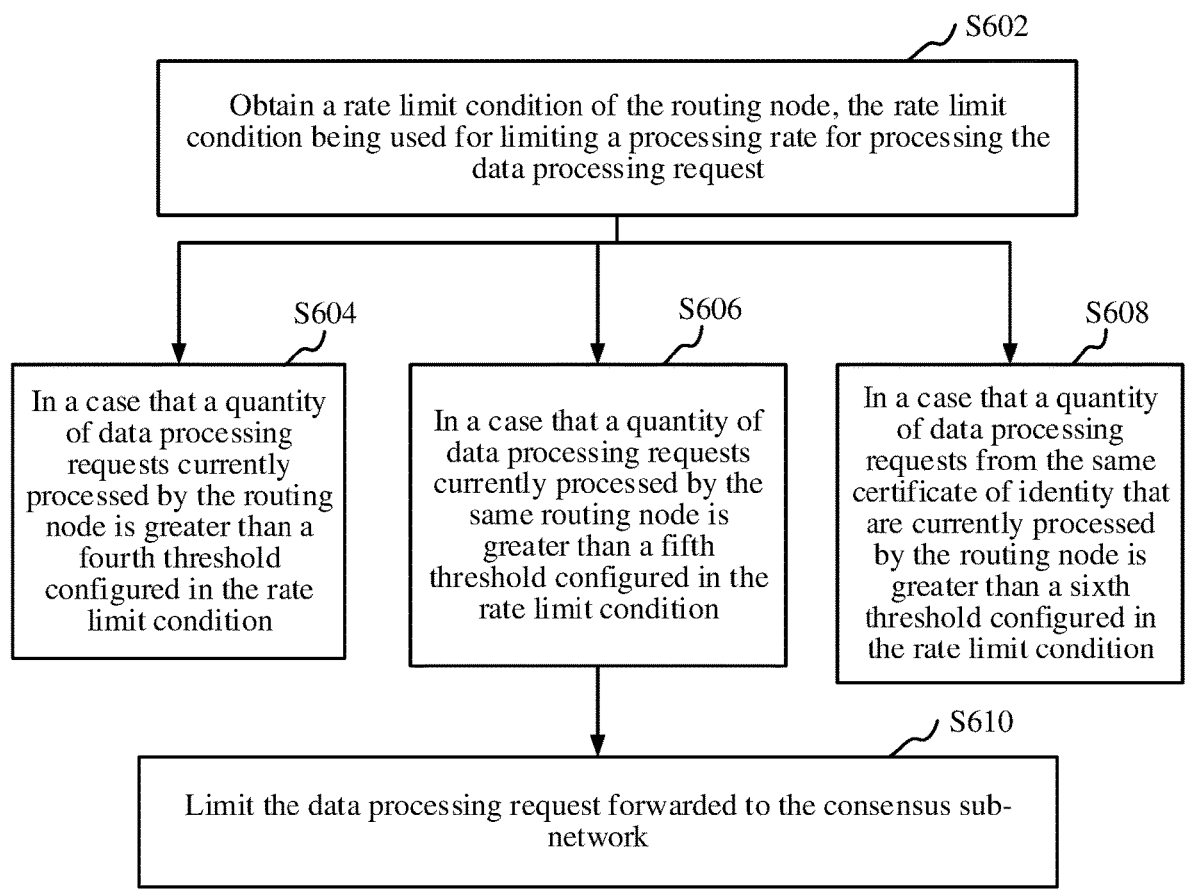
FIG. 6 is a schematic flowchart of limiting traffic of data processed by a routing node according to an embodiment.

In an embodiment, as shown in FIG. 6, the method further includes a step of limiting traffic of data processed by a routing node, specifically including:

S602. Obtain a rate limit condition of the routing node, the rate limit condition being used for limiting a processing rate for processing the data processing request.

S604. In a case that a quantity of data processing requests currently processed by the routing node is greater than a fourth threshold configured in the rate limit condition, or S606. In a case that a quantity of data processing requests currently processed by the same routing node is greater than a fifth threshold configured in the rate limit condition, or S608. In a case that a quantity of data processing requests from the same certificate of identity that are currently processed by the routing node is greater than a sixth threshold configured in the rate limit condition, perform step S610.

S610. Limit the data processing request forwarded to the consensus sub-network.

In this embodiment, the routing node further controls a rate at which the data processing request is sent, to ensure security of the consensus sub-network, and prevent network traffic in the entire routing layer from being excessively large, or the consensus node needs to consume an excessively large quantity of resources to process the data processing request sent by the routing node or send data. The rate limit condition is further stored in the routing node, to limit a rate at which the routing node processes the data processing request, thereby ensuring an upper limit of data traffic in the entire blockchain network.

The rate limit condition is a preset parameter and includes a fourth threshold corresponding to a quantity of data processing requests currently processed by the entire routing layer, a fifth threshold corresponding to a quantity of data processing request currently processed by the same routing node, and a sixth threshold corresponding to a quantity of data processing requests from the same certificate of identity that are currently processed by the routing node. The fourth threshold is used for setting an upper limit value for a maximum quantity of data processing requests processed by the entire routing layer per second. The fifth threshold is used for setting an upper limit value for a maximum quantity of data processing requests processed by the same routing node per second. The sixth threshold is used for setting an upper limit value for a maximum quantity of the data processing requests from the same certificate of identity processed by the routing node per second. The rate limit condition may effectively control a total quantity of data packets on the blockchain network. Different rate limits may be set for different functions or types of data processing requests, for example, a greater limit rate may be set for a relatively important and lightweight data chaining request, to implement better blockchain network performance, but for a request such as a transaction information query request that has a relatively large amount of data and does not have a high requirement on real-time performance, rate limit may be properly reduced, to prevent network traffic of the entire blockchain network from being excessively large. The fifth threshold and the sixth threshold may control data traffic of the current routing node, to ensure that the routing layer can treat each data processing request in a relatively fair manner, and avoid a problem that the blockchain network performance is reduced or a request cannot be responded to in time because a routing node occupies a large amount of resources.

Therefore, when the quantity of the data processing requests currently processed by the entire routing layer is greater than the fourth threshold, or when the quantity of the data processing requests currently processed by the same routing node is greater than the fifth threshold, or when the quantity of the data processing requests from the same certificate of identity that are currently processed the routing node is greater than the sixth threshold, a data processing rate of the entire routing layer or the single routing node may be limited.

In an embodiment, the method further includes: performing, when the data processing request is any one of designated requests, the operation of performing identity verification on the service node according to the data processing request; and limiting, when the data processing request is none of the designated requests, forwarding of the data processing request to the consensus sub-network, the designated request including at least a data chaining request, a block header obtaining request, a transaction information query request, and a basic information obtaining request for a consensus node.

In this embodiment, a function of the service node to access the consensus sub-network is limited. Each consensus node in the consensus sub-network is used as a blockchain node and has functions of a complete blockchain. However, based on requirements of confidentiality and security, the blockchain functions cannot be accessed by the service node completely. Therefore, the routing node needs to check a type of the data processing request, to ensure that only some functions are opened. The data processing request is forwarded to the consensus sub-network by the routing node only when the data processing request belongs to the data chaining request, the block header obtaining request, the transaction information query request, and the basic information obtaining request for a consensus node for liveness probing, and a request that is not a designated data processing request will be intercepted by the routing node and be prohibited from accessing the consensus sub-network.

In an embodiment, the routing node for isolating the service sub-network from the consensus sub-network belongs to the routing layer, and the routing layer includes a plurality of routing nodes having idempotence. The idempotence refers to that an external service node may initiate a request to any routing node in the routing layer for a plurality of times, and each routing node has the same processing logic. In this embodiment, the routing layer includes a plurality of routing nodes having idempotence, and each service node may select to be connected to and communicate with one or more routing nodes. Therefore, performance of the routing layer may be extended as required.

Figure 7:
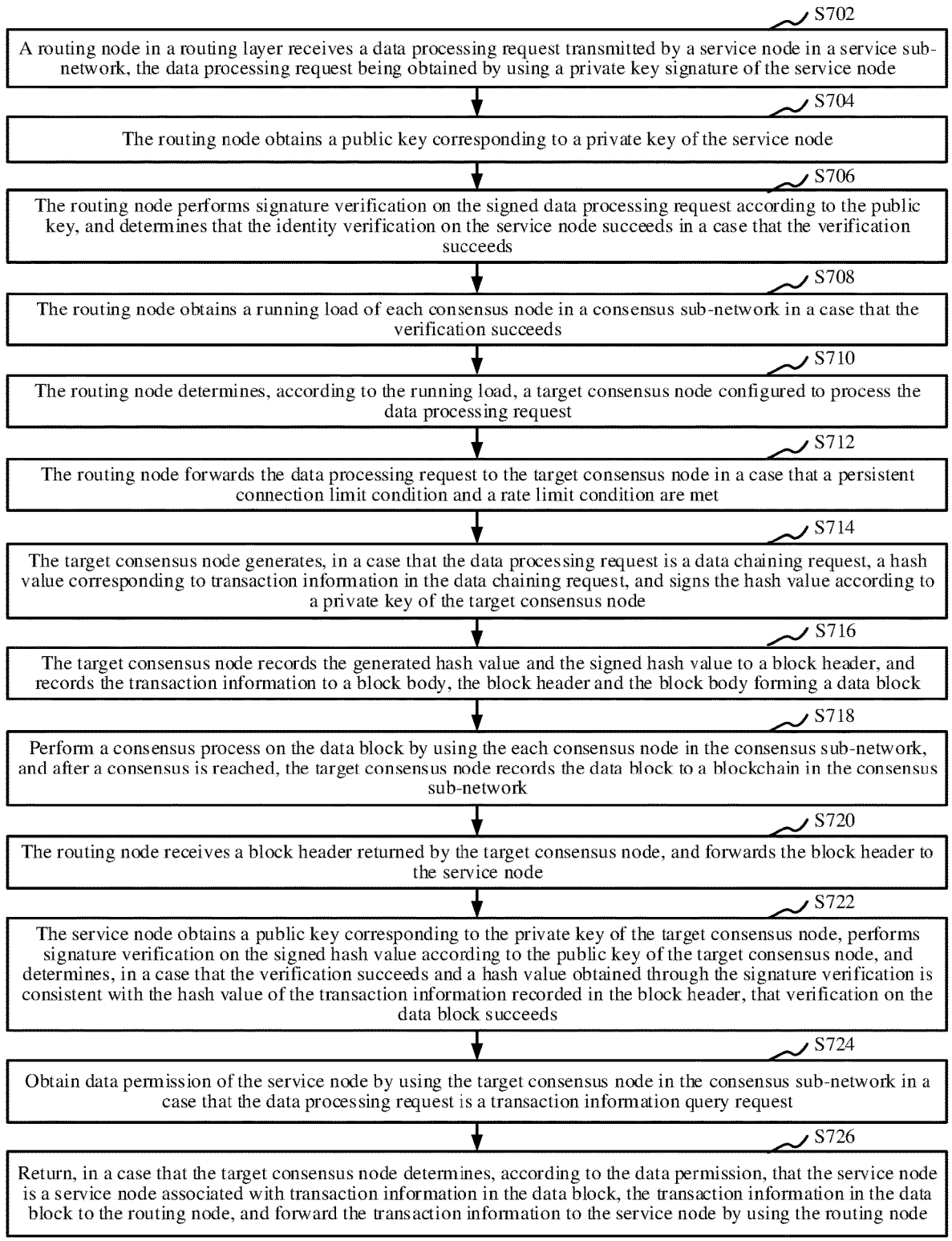
FIG. 7 is a schematic flowchart of a data processing method in a blockchain network according to a specific embodiment.

As shown in FIG. 7, in a specific embodiment, the data processing method in a blockchain network includes the following steps.

S702. A routing node in a routing layer receives a data processing request transmitted by a service node in a service sub-network, the data processing request being obtained by using a private key signature of the service node.

S704. The routing node obtains a public key corresponding to a private key of the service node.

S706. The routing node performs signature verification on the signed data processing request according to the public key, and determines that the identity verification on the service node succeeds when the verification succeeds.

S708. The routing node obtains a running load of each consensus node in a consensus sub-network when the verification succeeds.

S710. The routing node determines, according to the running load, a target consensus node configured to process the data processing request.

S712. The routing node forwards the data processing request to the target consensus node when a persistent connection limit condition and a rate limit condition are met.

S714. The target consensus node generates, when the data processing request is a data chaining request, a hash value corresponding to transaction information in the data chaining request, and signs the hash value according to a private key of the target consensus node.

S716. The target consensus node records the generated hash value and the signed hash value to a block header, and records the transaction information to a block body, the block header and the block body forming a data block.

S718. Perform a consensus process on the data block by using each consensus node in the consensus sub-network, and after a consensus is reached, the target consensus node records the data block to a blockchain in the consensus sub-network.

S720. The routing node receives a block header returned by the target consensus node, and forwards the block header to the service node.

S722. The service node obtains a public key corresponding to the private key of the target consensus node, performs signature verification on the signed hash value according to the public key of the target consensus node, and determines, when the verification succeeds and a hash value obtained through the signature verification is consistent with the hash value of the transaction information recorded in the block header, that verification on the data block succeeds.

S724. Obtain data permission of the service node by using the target consensus node in the consensus sub-network when the data processing request is a transaction information query request.

S726. Return, when the target consensus node determines, according to the data permission, that the service node is a service node associated with transaction information in the data block, the transaction information in the data block to the routing node, and forward the transaction information to the service node by using the routing node.

According to the data processing method in a blockchain network, a service sub-network is isolated from a consensus sub-network by using a routing node, and only the routing node has a capability of directly accessing the consensus sub-network. In this way, when any external service node needs to access a consensus node, an identity of the service node for transmitting a data processing request needs to be verified by using the routing node, to check security of each data processing request. The routing node obtains a running load of each consensus node in the consensus sub-network only when the identity verification succeeds, and only after a target consensus node configured to process the data processing request is determined from the consensus sub-network according to the running load, the routing node forwards the data processing request sent by the external service node to the consensus sub-network. Then, the consensus sub-network performs corresponding data processing on the data processing request, so that a possible danger existing in a case in which the consensus sub-network is under a network attack from an external node in a network level is avoided, thereby ensuring network security inside the consensus sub-network. In addition, data processing requests may be evenly forwarded, thereby improving processing performance of the consensus sub-network.

FIG. 7 is a schematic flowchart of a data processing method in a blockchain network according to an embodiment. It is to be understood that, although the steps in the flowchart of FIG. 7 are sequentially shown according to the pointing of arrows, the steps are not necessarily sequentially performed according to the sequence pointed by the arrows. Unless explicitly specified in this specification, the execution sequence of the steps is not strictly limited, and the steps may be performed in other sequences. In addition, at least some steps in FIG. 7 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step. In some embodiments, there may be additional steps or some of the steps shown may not be performed.

Figure 8:
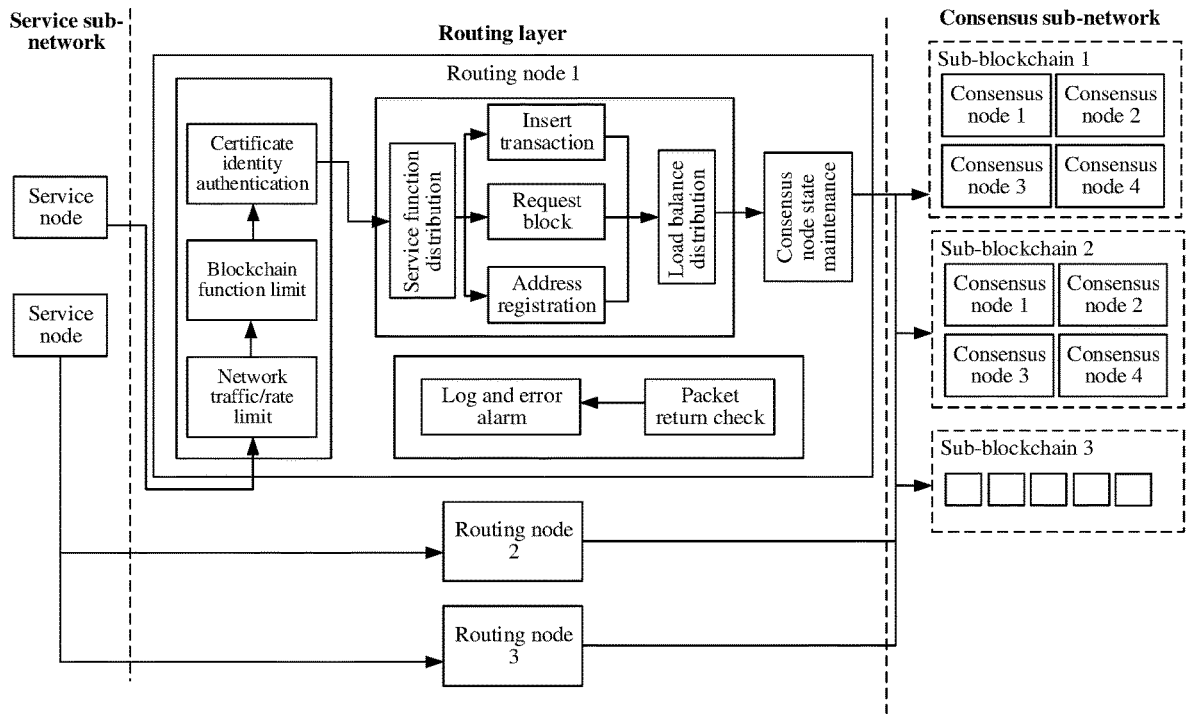
FIG. 8 is a schematic diagram of functional modules of a blockchain network according to an embodiment.

FIG. 8 is a schematic diagram of functional modules of a blockchain network according to a specific embodiment. Referring to FIG. 8, service nodes in a service sub-network access consensus nodes in a consensus sub-network by using a routing node, functional modules included in each routing node include a network traffic/rate limit module, configured to control network traffic and a quantity of data packets in an entire blockchain network, further include a blockchain function limit module, configured to limit an external service node to access some functions of the consensus sub-network, further include an identity verification module, configured to perform identity verification on each external service node initiating a request, further include a service function distribution function, configured to distribute different types of service requests, further include an insert transaction module, configured to forward an insert transaction request, a request block module, configured to forward a request data block, and an address registration module, configured to forward an address registration request, further include a load balance distribution module, configured to control the consensus nodes to evenly process requests, further include a consensus node state maintenance module, configured to determine whether the consensus node is currently available, and further include a packet return check module and a log and error alarm module, configured to analyze log data after receiving the log data returned by the consensus node.

Figure 9:
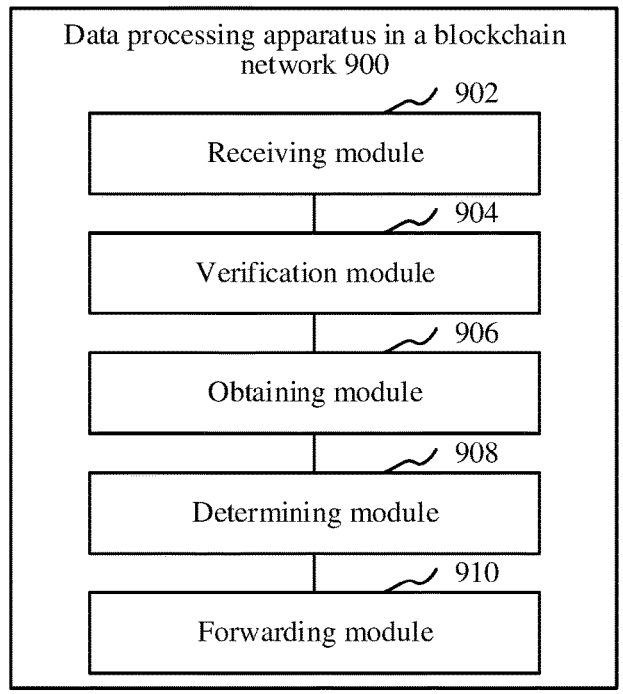
FIG. 9 is a structural block diagram of a data processing apparatus in a blockchain network according to an embodiment.

In an embodiment, as shown in FIG. 9, a data processing apparatus in a blockchain network 900 is provided and applied to a routing node in the blockchain network. The blockchain network includes a service sub-network, a consensus sub-network, and a routing node configured to isolate the service sub-network from the consensus sub-network. The apparatus includes a receiving module 902, a verification module 904, an obtaining module 906, a determining module 908, and a forwarding module 910.

The receiving module 902 is configured to receive a data processing request transmitted by a service node in the service sub-network.

The verification module 904 is configured to perform identity verification on the service node according to the data processing request.

The obtaining module 906 is configured to obtain a running load of each consensus node in the consensus sub-network when the verification succeeds.

The determining module 908 is configured to determine, from the consensus sub-network according to the running load, a target consensus node configured to process the data processing request.

The forwarding module 910 is configured to: forward the data processing request to the target consensus node and perform corresponding data processing on the data processing request by using the target consensus node.

In an embodiment, the data processing request is obtained by using a private key signature of the service node. The verification module 904 is further configured to: obtain a public key corresponding to a private key of the service node; perform signature verification on the signed data processing request according to the public key; and determine that the identity verification on the service node succeeds when the verification succeeds.

In an embodiment, the data processing request is a data chaining request, and the data chaining request forwarded by the forwarding module 910 is used for instructing the target consensus node in the consensus sub-network to: generate a hash value corresponding to transaction information in the data chaining request, and sign the hash value according to a private key of the consensus node; record the generated hash value and the signed hash value to a block header, and record the transaction information to a block body, the block header and the block body forming a data block; and perform a consensus process on the data block by using the consensus sub-network, and after a consensus is reached, record the data block to a blockchain in the consensus sub-network.

In an embodiment, the apparatus further includes: a block header forwarding module, configured to: receive a block header returned by the consensus node, and forward the block header to the service node, to cause the service node to obtain a public key corresponding to the private key of the consensus node, perform signature verification on the signed hash value according to the public key of the consensus node, and determine, when the verification succeeds and a hash value obtained through the signature verification is consistent with a hash value of transaction information recorded in the block header, that verification on the data block succeeds.

In an embodiment, the data processing request is a transaction information query request, and the transaction information query request forwarded by the forwarding module 910 is used for instructing the target consensus node in the consensus sub-network to: obtain data permission of the service node, and determine, according to the data permission by using the consensus node, whether the service node is a service node associated with transaction information in the data block. The forwarding module 910 is further configured to: receive, when the consensus node determines that the service node is the service node associated with the transaction information in the data block, transaction information returned by the consensus node, and forward the transaction information to the service node.

In an embodiment, the forwarding module 910 is further configured to: obtain the running load of the each consensus node in the consensus sub-network; determine, according to the running load, the target consensus node configured to process the data processing request; and forward the data processing request to the target consensus node.

In an embodiment, the apparatus is applied to a routing node in the routing layer and further includes a persistent connection limit module, configured to: obtain a persistent connection limit condition of the routing node, the persistent connection limit condition being used for limiting a quantity of persistent connections initiated by the service node to the routing node; and when a total quantity of persistent connections initiated by service nodes to the routing node exceeds a first threshold configured in the persistent connection limit condition, or when a quantity of persistent connections initiated by the same service node to the routing node exceeds a second threshold configured in the persistent connection limit condition, or when a quantity of persistent connections initiated by service nodes having the same certificate of identity to the routing node exceeds a third threshold, initiation of a persistent connection by the service node is limited. The use of the term limit may also include a stop, a prevention, or a disabling. Accordingly, in some embodiments, the request may be limited, stopped, prevented, or disabled In an embodiment, the apparatus is applied to a routing node in the routing layer and further includes a rate limit module, configured to: obtain a rate limit condition of the routing node, the rate limit condition being used for limiting a processing rate for processing the data processing request; and when a quantity of data processing requests currently processed by the routing node is greater than a fourth threshold configured in the rate limit condition, or when a quantity of data processing requests currently processed by the same routing node is greater than a fifth threshold configured in the rate limit condition, or when a quantity of data processing requests from the same certificate of identity that are currently processed by the routing node is greater than a sixth threshold configured in the rate limit condition, the data processing request forwarded to the consensus sub-network is limited. In some embodiments, the request may be limited, stopped, prevented, and/or disabled.

In an embodiment, the apparatus further includes a blockchain function limit module, configured to: trigger, when the data processing request is any one of a data chaining request, a block header obtaining request, a transaction information query request, and a basic information obtaining request for a consensus node, the verification module to perform the operation of performing identity verification on the service node according to the data processing request; and limit, when the data processing request is none of designated requests, forwarding of the data processing request to the consensus sub-network.

In an embodiment, the routing node for isolating the service sub-network from the consensus sub-network belongs to the routing layer, and the routing layer includes a plurality of routing nodes having idempotence.

According to the data processing apparatus in the blockchain network, a service sub-network is isolated from a consensus sub-network by using a routing node, and only the routing node has a capability of accessing the consensus sub-network. In this way, when an external service node needs to access a consensus node, an identity of the service node for transmitting a data processing request needs to be verified by using the routing node, to check security of each data processing request. The routing node obtains a running load of each consensus node in the consensus sub-network only when the identity verification succeeds, and only after a target consensus node configured to process the data processing request is determined from the consensus sub-network according to the running load, the routing node forwards the data processing request sent by the external service node to the consensus sub-network. Then, the consensus sub-network performs corresponding data processing on the data processing request, so that a possible danger existing in a case in which the consensus sub-network is under a network attack from an external node in a network level is avoided, thereby ensuring network security inside the consensus sub-network. In addition, data processing requests may be evenly forwarded, thereby improving processing performance of the consensus sub-network.

Figure 10:
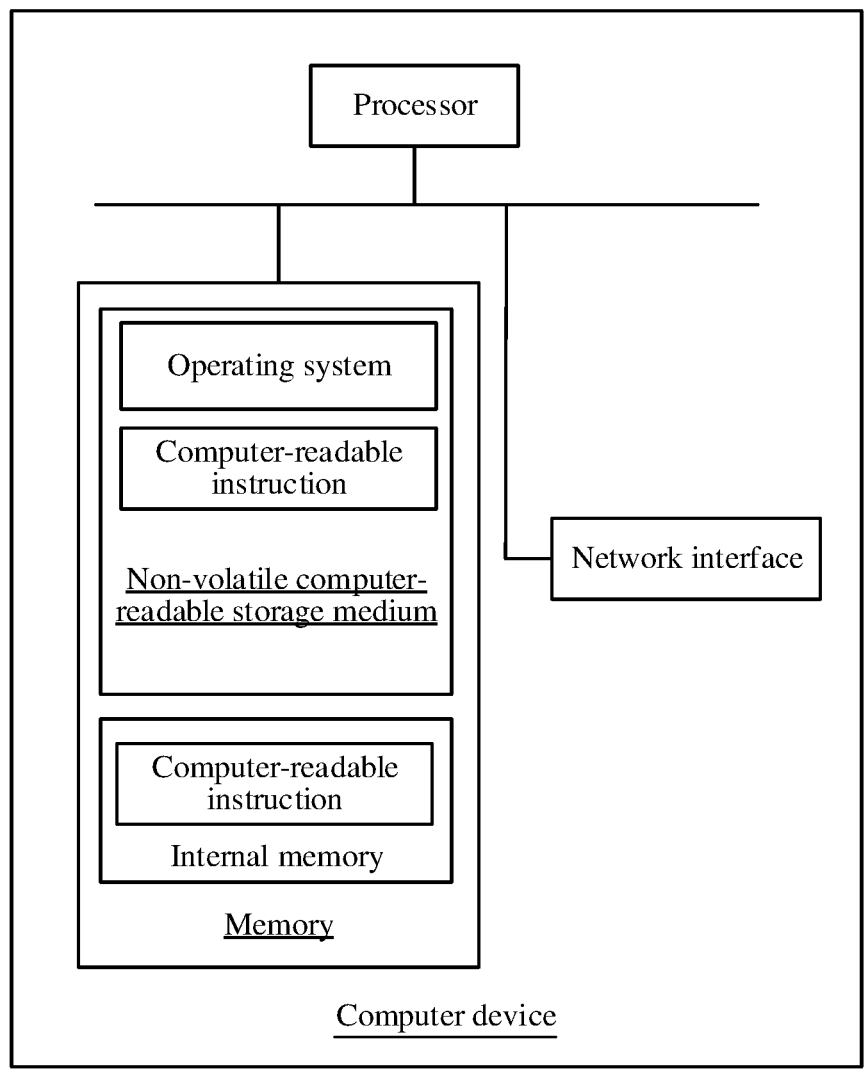
FIG. 10 is a structural block diagram of a computer device according to an embodiment.

FIG. 10 is a diagram of an internal structure of a computer device according to an embodiment. The computer device may be specifically a routing node 122 in FIG. 1 or may be other components in other Figures. As shown in FIG. 10, the computer device includes a processor, a memory, and a network interface connected with a system bus. The memory includes a non-volatile storage medium and an internal memory. The non-volatile storage medium of the computer device stores an operating system and computer-readable instructions, the computer-readable instructions, when executed by the processor, causing the processor to implement a data processing method in a blockchain network. The internal memory may also store computer-readable instructions, the computer-readable instructions, when executed by the processor, causing the processor to perform the data processing method in a blockchain network.

A person skilled in the art may understand that, the structure shown in FIG. 10 is only a block diagram of a part of a structure related to a solution of this application and does not limit the computer device to which the solution of this application is applied. Specifically, the computer device may include more or fewer components than those in the drawings, or some components are combined, or a different component deployment is used.

In an embodiment, the data processing apparatus in the blockchain network provided in this application may be implemented in a form of computer-readable instructions, and the computer-readable instructions are executable on the computer device shown in FIG. 10. The memory of the computer device may store program modules forming the data processing apparatus in the blockchain network, for example, the receiving module 902, the verification module 904, the obtaining module 906, the determining module 908, and the forwarding module 910 shown in FIG. 9. Computer-readable instructions formed by the program modules cause the processor to perform the steps in the data processing method in a blockchain network in the embodiments of this application described in this specification.

For example, the computer device shown in FIG. 10 may perform step S402 by using the receiving module 902 of the data processing apparatus in the blockchain network shown in FIG. 9. The computer device may perform step S404 by using the verification module 904. The computer device may perform step S406 by using the obtaining module 906. The computer device may perform step S408 by using the determining module 908. The computer device may perform step S410 by using the forwarding module 910.

In an embodiment, a computer device is provided, including: a memory and a processor. The memory stores computer-readable instructions, the computer-readable instructions, when executed by the processor, causing the processor to perform the steps in the foregoing data processing method in a blockchain network. The steps of the data processing method in a blockchain network herein may be the steps of the data processing method in a blockchain network in the foregoing embodiments.

In an embodiment, a computer-readable storage medium is provided, storing computer-readable instructions, the computer-readable instructions, when executed by the processor, causing the processor to perform the steps in the foregoing data processing method in a blockchain network. The steps of the data processing method in a blockchain network herein may be the steps of the data processing method in a blockchain network in the foregoing embodiments.

In an embodiment, a computer program product or a non-transitory computer-readable storage medium is provided, the computer program product or the non-transitory computer-readable storage medium includes computer-readable instructions, and the computer-readable instructions are stored in the non-transitory computer-readable storage medium. The processor of the computer device reads the computer-readable instructions from the non-transitory computer-readable storage medium, and the processor executes the computer-readable instructions, to cause the computer device to perform the steps in the foregoing method embodiments.

A person of ordinary skill in the art may understand that some or all procedures in the methods in the foregoing embodiments may be implemented by a non-transitory computer-readable instruction instructing related hardware, the program may be stored in a non-volatile computer-readable storage medium, and when the program is executed, the procedures in the foregoing method embodiments may be implemented. Any reference to a memory, a storage, a database, or another medium used in the embodiments provided in this application can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The technical features in the foregoing embodiments may be combined in various arrangements. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments show only several implementations of this application and are described in detail, which, however, are not to be construed as a limitation to the patent scope of this application. A person of ordinary skill in the art may further make variations and improvements without departing from the ideas of this application, which all fall within the protection scope of this application. Therefore, the protection scope of this patent application is subject to the protection scope of the appended claims.

What is claimed is:

1. A data processing method in a blockchain network, the blockchain network comprising a service sub-network, a consensus sub-network, and a routing layer configured to isolate the service sub-network from the consensus sub-network, and the method being performed by a computer device and comprising:
   receiving a data processing request transmitted by a service node in the service sub-network;
   performing identity verification on the service node according to the data processing request;
   obtaining a running load of each consensus node in the consensus sub-network when the verification succeeds;
   determining, from the consensus sub-network according to the running load, a target consensus node configured to process the data processing request;
   forwarding the data processing request to the target consensus node; and
   performing corresponding data processing on the data processing request by using the target consensus node;
   receiving a block header returned by the consensus node;
   forwarding the block header to the service node;
   obtaining a public key corresponding to a private key of the consensus node by using the service node;
   performing signature verification on a signed hash value according to the public key of the consensus node; and
   determining, when the signature verification succeeds and a hash value obtained through the signature verification is consistent with a hash value of transaction information recorded in the block header, that a verification on a data block succeeds.

2. The method according to claim 1, wherein the data processing request is obtained by using a private key signature of the service node.

3. The method according to claim 1, wherein the data processing request is a data chaining request, and the performing corresponding data processing on the data processing request comprises:
   generating, by using the consensus node in the consensus sub-network, the hash value corresponding to transaction information in the data chaining request;
   signing the hash value according to the private key of the consensus node;
   recording the generated hash value and the signed hash value into the block header by using the consensus node;
   recording the transaction information into a block body, the block header and the block body forming the data block; and
   performing a consensus process on the data block by using the consensus sub-network, and recording the data block to a blockchain in the consensus sub-network after the consensus is reached.

4. The method according to claim 1, wherein the data processing request is a transaction information query request, and the performing corresponding data processing on the data processing request by using the target consensus node comprises:
obtaining data permission of the service node by using the consensus node in the consensus sub-network; and
determining, by using the consensus node according to the data permission, whether the service node is a service node associated with transaction information in the data block; and
the method further comprises:
receiving, when the consensus node determines that the service node is the service node associated with the transaction information in the data block, transaction information returned by the consensus node, and forwarding the transaction information to the service node.

5. The method according to claim 1, wherein the method is performed by a routing node in the routing layer, and further comprises:
obtaining a persistent connection limit condition of the routing node, the persistent connection limit condition being used for limiting a quantity of persistent connections initiated by the service node to the routing node; and
when a total quantity of persistent connections initiated by service nodes to the routing node exceeds a first threshold configured in the persistent connection limit condition, or
when a quantity of persistent connections initiated by the same service node to the routing node exceeds a second threshold configured in the persistent connection limit condition, or
when a quantity of persistent connections initiated by service nodes having the same certificate of identity to the routing node exceeds a third threshold,
limiting a behavior of initiating a persistent connection by the service node.

6. The method according to claim 1, wherein the method is performed by a routing node in the routing layer, and further comprises:
obtaining a rate limit condition of the routing node, the rate limit condition being used for limiting a processing rate for processing the data processing request; and
when a quantity of data processing requests currently processed by the routing node is greater than a fourth threshold configured in the rate limit condition, or
when a quantity of data processing requests currently processed by the same routing node is greater than a fifth threshold configured in the rate limit condition, or
when a quantity of data processing requests from the same certificate of identity that are currently processed by the routing node is greater than a sixth threshold configured in the rate limit condition,
limiting the data processing request forwarded to the consensus sub-network.

7. The method according to claim 1, further comprising:
performing, when the data processing request is any one of designated requests, identity verification on the service node according to the data processing request; and
stopping, when the data processing request is none of the designated requests, forwarding of the data processing request to the consensus sub-network,
the designated request comprising at least a data chaining request, a block header obtaining request, a transaction information query request, and a basic information obtaining request for a consensus node.

8. The method according to claim 7, wherein the routing layer is configured to isolate the service sub-network from the consensus sub-network and comprises a plurality of routing nodes having idempotence.

9. One or more non-transitory computer-readable storage media, storing computer-readable instructions, the computer-readable instructions, when executed by one or more processors, causing the one or more processors to perform operations comprising:
receiving a data processing request transmitted by a service node in a service sub-network, wherein a blockchain network comprises the service sub-network, a consensus sub-network, and a routing layer configured to isolate the service sub-network from the consensus sub-network;
performing identity verification on the service node according to the data processing request;
obtaining a running load of each consensus node in the consensus sub-network when the verification succeeds;
determining, from the consensus sub-network according to the running load, a target consensus node configured to process the data processing request;
forwarding the data processing request to the target consensus node; and
performing corresponding data processing on the data processing request by using the target consensus node;
receiving a block header returned by the consensus node;
forwarding the block header to cause the service node to obtain a public key corresponding to a private key of the consensus node;
performing signature verification on a signed hash value according to the public key of the consensus node; and
determining, when the verification succeeds and a hash value obtained through the signature verification is consistent with a hash value of transaction information recorded in the block header, that a verification on a data block succeeds.

10. The one or more non-transitory computer-readable storage media according to claim 9, wherein the data processing request is obtained by using a private key signature of the service node, and the identity verification further comprises:
obtaining a public key corresponding to a private key of the service node.

11. The one or more non-transitory computer-readable storage media according to claim 9, wherein the data processing request is a data chaining request, and the forwarded data chaining request is used for instructing the consensus node in the consensus sub-network to:
generate a hash value corresponding to transaction information in the data chaining request;
sign the hash value according to a private key of the consensus node;
record the generated hash value and the signed hash value to a block header;
record the transaction information to a block body, the block header and the block body forming a data block;
perform a consensus process on the data block by using the consensus sub-network; and
record the data block to a blockchain in the consensus sub-network after the consensus is reached.

12. The one or more non-transitory computer-readable storage media according to claim 9, wherein the data processing request is a transaction information query request, the transaction information query request is used for instructing the consensus node in the consensus sub-network to:
  obtain data permission of the service node; and
  determine, according to the data permission, whether the service node is a service node associated with transaction information in the data block; and
  the forwarding further comprises:
    receive, when the consensus node determines that the service node is the service node associated with the transaction information in the data block, transaction information returned by the consensus node; and
    forward the transaction information to the service node.

13. The one or more non-transitory computer-readable storage media according to claim 9, wherein the operations are applied to a routing node in the routing layer, and further comprises:
  obtaining a persistent connection limit condition of the routing node, the persistent connection limit condition being used for limiting a quantity of persistent connections initiated by the service node to the routing node; and
  when a total quantity of persistent connections initiated by service nodes to the routing node exceeds a first threshold configured in the persistent connection limit condition, or when a quantity of persistent connections initiated by the same service node to the routing node exceeds a second threshold configured in the persistent connection limit condition, or when a quantity of persistent connections initiated by service nodes having the same certificate of identity to the routing node exceeds a third threshold, limit initiation of a persistent connection by the service node.

14. The one or more non-transitory computer-readable storage media according to claim 9, wherein the operations are applied to a routing node in the routing layer, and further comprise:
  obtaining a rate limit condition of the routing node, the rate limit condition being used for limiting a processing rate for processing the data processing request; and
  when a quantity of data processing requests currently processed by the routing node is greater than a fourth threshold configured in the rate limit condition, or when a quantity of data processing requests currently processed by the same routing node is greater than a fifth threshold configured in the rate limit condition, or when a quantity of data processing requests from the same certificate of identity that are currently processed by the routing node is greater than a sixth threshold configured in the rate limit condition, stop the data processing request forwarded to the consensus sub-network.

15. The one or more non-transitory computer-readable storage media according to claim 10, wherein the operations further comprise:
  performing, when the data processing request is any one of designated requests, identity verification on the service node according to the data processing request; and
  stopping, when the data processing request is none of the designated requests, forwarding of the data processing request to the consensus sub-network, the designated request comprising at least a data chaining request, a block header obtaining request, a transaction information query request, and a basic information obtaining request for a consensus node.

16. A computer device, comprising a non-transitory memory and one or more processors, the memory storing computer-readable instructions, the computer-readable instructions, when executed by the one or more processors, causes the one or more processors to:
  receive a data processing request transmitted by a service node in a service sub-network;
  perform identity verification on the service node according to the data processing request;
  obtain a running load of each consensus node in a consensus sub-network when the verification succeeds;
  determine, from the consensus sub-network according to the running load, a target consensus node configured to process the data processing request; and
  forward the data processing request to the target consensus node, and performing corresponding data processing on the data processing request by using the target consensus node;
  receive a block header returned by the consensus node;
  forward the block header to cause the service node to obtain a public key corresponding to a private key of the consensus node;
  perform signature verification on a signed hash value according to the public key of the consensus node; and
  determine, when the verification succeeds and a hash value obtained through the signature verification is consistent with a hash value of transaction information recorded in the block header, that a verification on a data block succeeds.

17. The computer device of claim 16, wherein the data processing request is a data chaining request, and the performing corresponding data processing on the data processing request by using the target consensus node further comprises:
  generate, by using the consensus node in the consensus sub-network, a hash value corresponding to transaction information in the data chaining request;
  sign the hash value according to a private key of the consensus node;
  record the generated hash value and the signed hash value into a block header by using the consensus node;
  record the transaction information into a block body, the block header and the block body forming a data block; and
  perform a consensus process on the data block by using the consensus sub-network, and recording the data block to a blockchain in the consensus sub-network after the consensus is reached.

18. The computer device of claim 16, wherein the computer-readable instructions, when executed by the one or more processors, further causes the one or more processors to:
  obtain a persistent connection limit condition of a routing node, the persistent connection limit condition being used for limiting a quantity of persistent connections initiated by the service node to the routing node; and
  when a total quantity of persistent connections initiated by service nodes to the routing node exceeds a first threshold configured in the persistent connection limit condition, or
  when a quantity of persistent connections initiated by the same service node to the routing node exceeds a second threshold configured in the persistent connection limit condition, or
  when a quantity of persistent connections initiated by service nodes having the same certificate of identity to the routing node exceeds a third threshold, limit a behavior of initiating a persistent connection by the service node.

19. The computer device of claim 16, wherein the computer-readable instructions, when executed by the one or more processors, further causes the one or more processors to:
  obtain a rate limit condition of a routing node, the rate limit condition being used for limiting a processing rate for processing the data processing request; and
  when a quantity of data processing requests currently processed by the routing node is greater than a fourth threshold configured in the rate limit condition, or
  when a quantity of data processing requests currently processed by the same routing node is greater than a fifth threshold configured in the rate limit condition, or
  when a quantity of data processing requests from the same certificate of identity that are currently processed by the routing node is greater than a sixth threshold configured in the rate limit condition,
limit the data processing request forwarded to the consensus sub-network.

20. The computer device of claim 16, wherein the computer-readable instructions, when executed by the one or more processors, further causes the one or more processors to:
  perform, when the data processing request is any one of designated requests, identity verification on the service node according to the data processing request; and
  stop, when the data processing request is none of the designated requests, forwarding of the data processing request to the consensus sub-network,
  wherein the designated request comprises at least a data chaining request, a block header obtaining request, a transaction information query request, and a basic information obtaining request for a consensus node.

* * * * *